July 13, 1926.
E. R. SLAGLE
VALVE
Filed Dec. 22, 1925
1,592,748
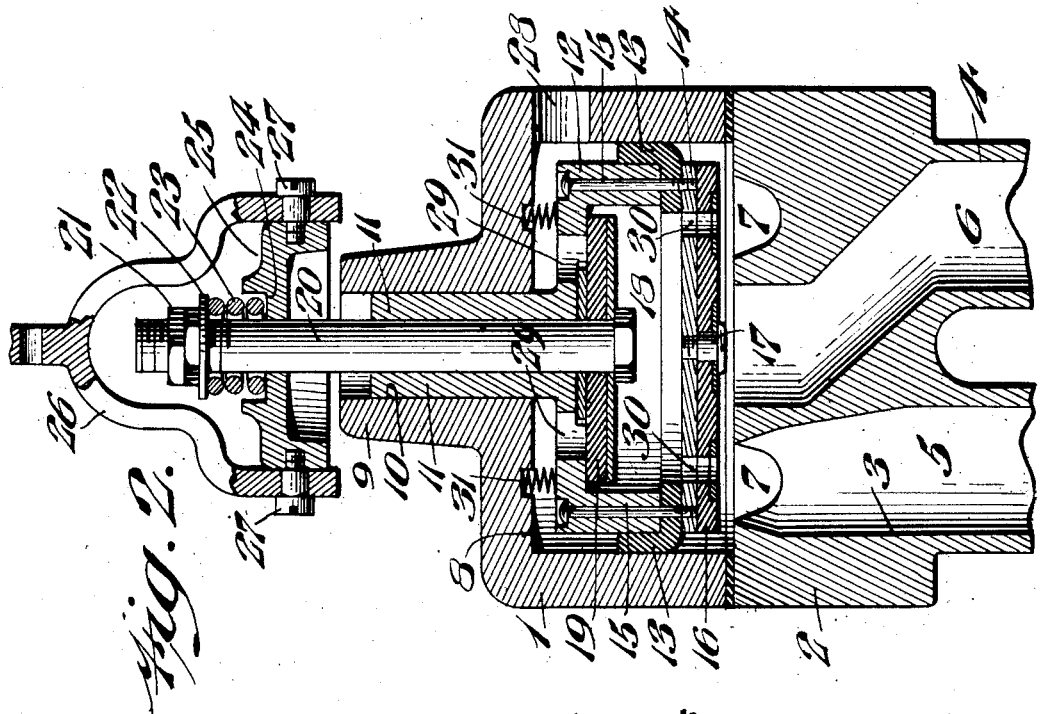
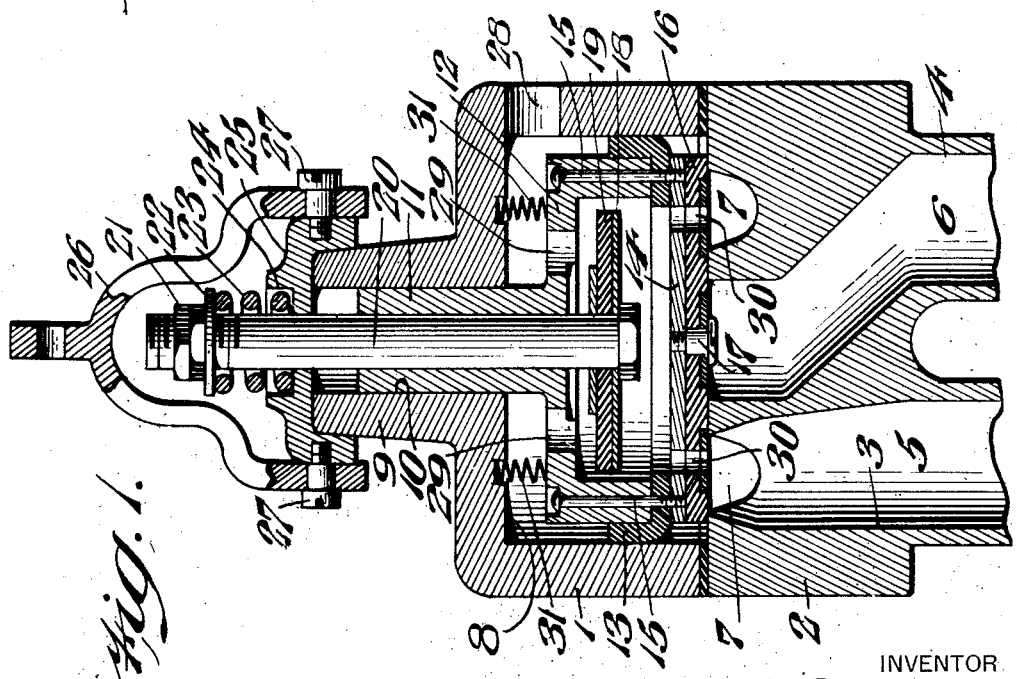
INVENTOR
EVERETT R. SLAGLE,
BY
ATTORNEYS.

Patented July 13, 1926.

1,592,748

UNITED STATES PATENT OFFICE.

EVERETT R. SLAGLE, OF SAYRE, PENNSYLVANIA, ASSIGNOR, BY MESNE ASSIGNMENTS, TO STANDARD VACUUM BRAKE CO., OF CAMDEN, NEW JERSEY, A CORPORATION OF NEW JERSEY.

VALVE.

Application filed December 22, 1925. Serial No. 77,000.

This invention relates to an improvement in valves.

The object of my invention is to provide an improved three-way valve mechanism, in which two valves are employed, one of which is closed before the other is opened. This insures proper communication of the various ports of the valve with each other, in order to transfer the fluid properly through these various ports.

In this valve construction, a valve-chamber is provided within the casing, into which chamber a plurality of ports open. A valve is arranged to close one of these ports, but is provided with a central opening and a plurality of radial openings in order to leave another of the ports open or in communication with the third. Within this first-mentioned valve, a second valve is arranged in order to cut off this last-mentioned communication. The operating mechanism having the two valves is so arranged that one of the valves is closed or seated on its seat before the other is opened.

For the purpose of illustrating my invention I have shown in the accompanying drawings a form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings:—

Fig. 1 is a vertical sectional view through my improved valve mechanism, showing the main valve seated, and the release valve unseated; and Fig. 2 is a similar view with the valves in their opposite extreme positions.

The valve is formed of a casing having upper and lower sections 1 and 2, respectively. The lower section terminates in extended nipples 3 and 4, through which openings 5 and 6 respectively extend. The opening 5 terminates at its inner end in an annular recess 7 formed in the face of the section 2 of the valve-casing. The section 1 is made substantially hollow, providing an internal valve-chamber 8 for receiving the valve mechanism hereinafter described.

The section 1 of the casing terminates in an upward extension 9 provided with a central opening 10 extending therethrough and communicating with the valve-chamber 8.

The main valve is formed with a sleeve 11 slidable in the opening 10, which sleeve terminates at its inner end in a main valve 12, to which is secured the valve-washer 13 and a metal-plate 14, by means of the screws 15, as clearly shown in the drawings. A valve-disk 16 is secured to the plate 14 by means of a screw 17 extending through the center thereof.

The main valve 12 is made hollow in the center thereof, providing an internal valve-chamber 18 for the release valve 19. The release valve 19 has a valve-stem 20 secured thereto, which stem extends through the sleeve 11. The outer end of the valve-stem 20 has a nut 21 and washer 22 secured thereon, against which the spring 23 abuts. The opposite end of the spring 23 is received in a seat 24 in the cap 25, normally resting upon the outer end of the upward extension 9. A yoke 26 is connected with the cap 25 by means of the screws 27. The yoke 26 may be connected with any suitable mechanism for actuating the valves, preferably a foot pedal in proximity to a conventional or standard brake pedal of an automobile. The port 28 leads to the atmosphere. The ports 29 are controlled by the release valve 19, and communicate with the chamber 18 within the main valve 12, and similar openings or ports 30 are provided through the plate 14 and valve-disk 16, which closes the lower end of this chamber 18. These openings 30, of which a plurality may be provided around the valve, are in alignment with the annular recess 7. The opening 6 is connected directly to the tank or reservoir from which the air has been partly withdrawn. The opening 5 is connected to any desired movable or vacuum actuated device. The main valve 12 is normally closed and the release valve 19 is normally open and there is no tension applied against the washer 22 by the spring 23, the parts now appearing as seen in Fig. 1. The opening or passage 6 may if desired be connected directly to the intake manifold of an internal combustion engine, while the opening or passage 5 may if desired be connected to suitable brake chambers.

The operation of the valve is as follows:—

The yoke 26 is moved in an upward direction causing the release valve 19 to close the ports 29. Any further movement of the yoke would cause the main valve 12 to lift from its seat permitting the air to be withdrawn from the opening 5 through the chamber 8 into the opening 6 and thus into the tank or the intake manifold.

When sufficient air has been removed from the vacuum actuated device to create a partial vacuum therein, the vacuum on the lower end of the main valve 12, overcomes the tension of the spring 23, causing the main valve 12 to pull down against its seat, thereby shutting off the opening 6. The tension of the spring determines the point at which the main valve closes. To release the vacuum in the vacuum actuated device, the yoke 26 is moved downwardly thus reducing the tension on the spring 23. It can readily be seen that the vacuum on the underside of the release valve 19 would cause it to open sufficiently to allow a small quantity of air to enter from the atmosphere until the spring tension is again balanced through the port 28, and through the opening in the main valve 30 into the opening 5 thereby reducing the vacuum in the vacuum actuated device. Still further downward movement would cause the valve 19 to release still more and when the yoke 25 is in its normal position, the release valve would be entirely open as seen in Fig. 1 permitting atmospheric pressure to enter the opening 5.

The advantages of a valve of this character are as follows:—When used in connection with the proper brake chambers for applying the brakes of an automobile or motor bus, it is possible to make a gradual or instantaneous stop at the will of the driver by the actuation of the yoke to the desired extent. When a proper amount of air has been withdrawn from the brake chambers, the valve automatically shuts off regardless of the vacuum in the tank or the intake manifold of an internal combustion engine.

It also provides an instantaneous release which is necessary for the operation of these vehicles.

The cup washer 13 prevents leaking of the atmosphere through the port 28 into the openings 5 and 6 when the release valve 19 is closed as seen in Fig. 2. The springs 31 are for maintaining a normally closed position of the main valve when there is no vacuum in the openings 5 and 6.

It will thus be noted that this invention provides a simple, efficient and inexpensive valve mechanism for establishing communication between any of a plurality of ports, or for cutting off any of these ports from each other. Provision is also made in the valve construction for closing one valve before the other is opened, and vice versa.

It will now be apparent that I have devised a novel and useful valve construction which embodies the features of advantage enumerated as desirable in the statement of the invention and the above description and while I have in the present instance shown and described the preferred embodiments thereof which have been found in practice to give satisfactory and reliable results it is to be understood that the same are susceptible of modification in various particulars without departing from the spirit or scope of the invention or sacrificing any of its advantages.

I claim:—

1. In a device of the character stated, a valve casing having a port open to the atmosphere, a main valve in said casing and provided with upper and lower ports, a release valve located within said main valve and adapted to control the upper ports of said main valve, a plurality of passages in the lower portion of said valve casing and means for enabling the lower ports of said main valve to communicate at all times with one of said passages.

2. In a device of the character stated, a valve casing having a port in its upper portion open to the atmosphere, a main valve in said casing and provided with upper and lower ports, a release valve located within said main valve, and adapted to control the upper ports of said main valve, a plurality of passages in the lower portion of said valve casing, means for enabling the lower ports of said main valve to communicate at all times with one of said passages and springs interposed between the top wall of said valve casing and the top of said main valve for forcing the latter downwardly upon its seat.

3. In a device of the character stated, a valve casing having a port therein and a cap mounted on the top thereof, a yoke connected to said cap, a main valve in said casing and provided with upper and lower ports, a release valve contained within said main valve and adapted to control the upper ports thereof, a valve stem for said release valve, an abutment on the upper end of said valve stem and a spring interposed between said cap and said abutment.

4. In a device of the character stated, a valve casing having a port open to the atmosphere and a cap mounted on the top thereof, a yoke connected to said cap, a main valve in said casing and provided with upper and lower ports, a release valve contained within said main valve and adapted to control the upper ports thereof, a valve stem for said release valve, an abutment on the upper end of said valve stem, a spring interposed between said cap and said abutment, a plurality of passages leading from the lower portion of said valve and means for forming a communication at all times between the lower ports of said main valve and one of said passages.

5. A valve mechanism including a valve-casing having a valve compartment therein, central and lateral openings communicating with said valve compartment, a valve normally covering one of said openings and adapted to be held in said position by means of a suction applied thereto through said covered opening, means for causing said valve compartment to communicate with the atmosphere, and means for causing communication of said lateral opening with the atmosphere.

6. A valve mechanism including a casing having a valve-chamber therein, and a port open to the atmosphere central and lateral openings communicating with said chamber, a main valve received in said chamber, and having a release valve slidable therein, said main valve having openings therethrough in position to be closed by said release valve.

7. A valve mechanism including a valve casing having central and lateral openings therein, said casing having a valve-chamber therein with which said openings communicate, a main valve slidable in said valve-chamber in position to close one of said openings, said main valve having an opening therein, a release valve for closing said opening, and means for moving said release valve to its seated position for closing the opening before the main valve is unseated.

8. A valve mechanism including a valve-casing having a valve-chamber therein, and having openings communicating with said valve-chamber, a main valve mounted in the valve-chamber, and having a sleeve thereon, said main valve being hollow, a release valve slidably mounted therein, a valve-stem connected with said release valve and slidable through said sleeve, said main valve having a plurality of openings therein in position to be closed by said release valve, a cap connected with the outer end of said valve-stem, and a yoke connected to said cap for seating or unseating the valves.

9. A valve mechanism including a casing having a valve-chamber therein, a plurality of openings communicating with one side of said valve-chamber, a main valve slidably received in said valve-chamber, a disk carried by said main valve for closing one of the openings, means for normally holding said valve-disk on its seat, an upward extension for said casing having an opening therethrough, a sleeve connected with the main valve, and extending into said extension, said main valve having a plurality of openings therethrough, a release valve slidably received in said main valve in position to close the openings therethrough, a valve-stem connected with said release valve and extending through said sleeve, a cap mounted adjacent said outer end of the extension, a spring interposed between the outer end of said valve-stem and the cap, tension devices intermediate said cap and stem and a yoke connected to said cap.

10. In a device of the character stated, a valve casing having a valve chamber therein, and an open port leading to the atmosphere, a main valve in said casing and provided with upper and lower ports, a plurality of openings in the lower portion of said casing, one of said openings being centrally disposed and the other eccentrically disposed to the axis of said casing, there being an annular groove in proximity to the main valve seat communicating at all times with one of said openings, the lower ports in said main valve also communicating with said annular groove, a release valve movable in said main valve and adapted to control the upper ports in said main valve, and springs intermediate said casing and the top of said main valve for forcing the latter towards its seat.

11. In a device of the character stated, a valve casing having a plurality of openings in the lower portion and side thereof, a hollow main valve in said casing for controlling one of said lower openings, said main valve having ports in the upper and lower walls thereof, an upward extension on said valve casing, a sleeve extending upwardly from said main valve and guided in said extension, a release valve contained within said main valve and controlling the upper ports therein, a valve stem for said release valve slidable in said sleeve, an abutment on the upper end of said stem, a cap mounted on the top of said extension, and a spring interposed between said abutment and cap.

12. In a device of the character stated, a valve casing having a plurality of openings in the lower portion and side thereof, a hollow main valve in said casing for controlling one of said lower openings, said main valve having ports in the upper and lower walls thereof, an upward extension on said valve casing, a sleeve extending upwardly from said main valve and guided in said extension a release valve contained within said main valve and controlling the upper ports therein, a valve stem for said release valve slidable in said sleeve, an abutment on the upper end of said stem, a cap mounted on the top of said extension, a spring interposed between said abutment and cap, and tension devices interposed between the top of said casing and the top of said main valve for forcing the latter downwardly upon its seat.

In testimony whereof I affix my signature.

EVERETT R. SLAGLE.